United States Patent [19]

Burns et al.

[11] Patent Number: 4,678,267
[45] Date of Patent: Jul. 7, 1987

[54] PARABOLIC OPTICAL WAVEGUIDE HORNS AND DESIGN THEREOF

[75] Inventors: William K. Burns, Alexandria, Va.; A. Fenner Milton, Washington, D.C.

[73] Assignee: The United States of America as represented by the Secretary of the Navy, Washington, D.C.

[21] Appl. No.: 279,105

[22] Filed: Jun. 30, 1981

Related U.S. Application Data

[63] Continuation of Ser. No. 852,646, Nov. 18, 1977, abandoned.

[51] Int. Cl.$^4$ ............................................... G02B 6/26
[52] U.S. Cl. ................................................. 350/96.15
[58] Field of Search ............... 350/96.15, 96.18, 96.30, 350/96.31

[56] References Cited

U.S. PATENT DOCUMENTS

| | | | |
|---|---|---|---|
| 3,779,628 | 12/1973 | Kapron et al. | 350/96.15 |
| 3,832,028 | 8/1974 | Kapron | 350/96.31 |
| 3,995,935 | 12/1976 | McCartney | 350/96.15 |
| 4,011,005 | 3/1977 | Hawkes | 350/96.15 |
| 4,415,227 | 11/1983 | Unger | 350/96.15 |

FOREIGN PATENT DOCUMENTS 1017354  1/1966  United Kingdom ............ 350/96.18

OTHER PUBLICATIONS

W. K. Burns, A. F. Milton, and A. B. Lee, *Applied Physics Letters*, vol. 30, No. 1, Jan. 1, 1977, pp. 28–30, "Optical Waveguide Parabolic Coupling Horns".

Primary Examiner—Frank González
Attorney, Agent, or Firm—John L. Forrest; William T. Ellis

[57] ABSTRACT

Coupling between narrow-and wide-channel optical waveguides is found to be very efficiently performed by coupling regions in the form of parabolas. Design equations for parabolic coupling regions are given.

2 Claims, 3 Drawing Figures

PARABOLIC OPTICAL WAVEGUIDE HORNS AND DESIGN THEREOF

This is a continuation of application Ser. No. 852,646, filed 11/18/77 now abandoned.

BACKGROUND OF THE INVENTION

This invention relates to coupling between narrow- and wide-channel optical waveguides and especially to parabolic horns for coupling between such waveguides.

Many devices in integrated optics require transitions between planar waveguides or wide-channel waveguides, which support many modes, and narrow-channel waveguides, which support only a single mode. For these horn-shaped transition regions to efficiently transfer optical power, the first-order mode should propagate adiabatically through the device without mode conversion to higher-order modes or to radiation modes. The problem of the design of tapered horn-shaped structures for minimum length has been considered theoretically by Winn and Harris in Applied Optics 14, 3012 (1975) and by Nelson in IEEE Trans. Microwave Memory Tech. MTT-23, 92 (1975). They give coupling efficiencies for various length linear tapers in glass waveguide systems and Winn and Harris showed that a given coupling efficiency could be achieved in a shorter length by using an exponential taper. Unfortunately these results are not conveniently adaptable to other waveguide systems, such as the metal-ion diffused ferro-electrics. To date no experimental coupling efficiencies have been published.

The design given herein is for a shaped coupling horn based on considerations of adiabatic propagation in waveguides and a desire to minimize length. In the limit of well-confined modes far from cutoff, the criterion reduces to a design based on diffraction theory and the horn shape becomes parabolic. The design criteria can be easily applied to any waveguide system whose dispersion characteristics are known and to any wavelength, and is therefore completely general. Reported herein are some measurements of coupling efficiencies made with various-sized channel waveguides in Ti-diffused $LiNbO_3$.

SUMMARY OF THE INVENTION

Low-loss coupling between narrow- and wide-channel optical waveguides is achieved by coupling horns of parabolic shape when the coupled modes are well-confined and far from the cutoff wavelength.

DETAILED DESCRIPTION OF THE INVENTION

Figure 1:
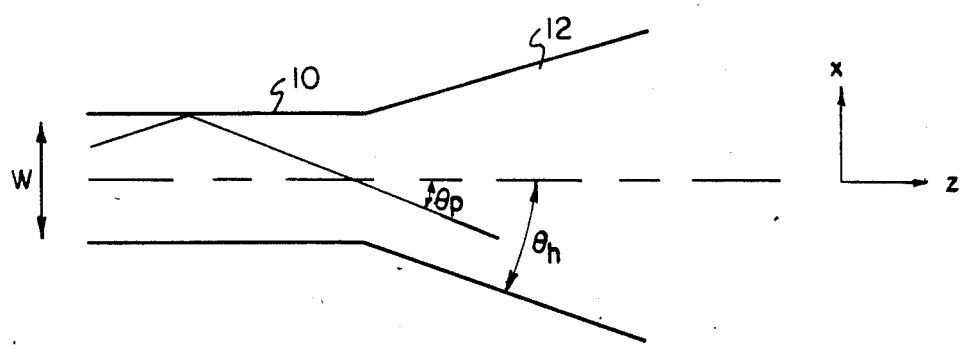
FIG. 1 is a schematic diagram showing the propagation of a ray of the lowest-order mode through a narrow-channel waveguide into a linear coupling horn.

A plan view of a two-dimensional channel waveguide 10 of width W feeding into a linear horn 12 is shown schematically in FIG. 1. It is desired to expand W but maintain nearly adiabatic propagation for the first-order mode. Using a ray model to describe the mode propagation, let $\theta_p$ be the projection of the ray angle of the lowest-order mode in the plane of the horn. The horn angle $\theta_h$ is defined as the local angle of the wall of the waveguide with the axis of the channel z. if $\theta_h$ exceeded $\theta_p$, in the ray model the ray would not "see" the waveguide wall and the phase front of the wave would become distorted, resulting in mode conversion from the first-order local normal mode. Therefore, a design criterion should be $$\theta_h(z) = \alpha \theta_p(z), \quad (1)$$

where $\alpha$ is a constant less than or equal to unity. Equation (1) is to be interpreted locally so that as W increases with z, $\theta_p$ and $\theta_h$ decrease and the horn angle becomes shallower as it expands. The constant $\alpha$ is chosen smaller if a smaller amount of mode coversion is desired. Note that this criterion only gives a rationale for a specific horn shape while actual coupling efficiency for a given case must be calculated independently or measured experimentally.

Assume a diffused channel waveguide of width W. A parameter $\Delta_n$ is defined to be the index difference between the surface index $n_s$, which would be obtained for a wide channel with $W \to \infty$, and the bulk index $n_b$. The effective index method can be used to approximate the projection of the ray angle for the case of no sideways diffusion as $$\cos \theta_p = (n_b + \Delta n b b')/(n_b + \Delta n b) \quad (2)$$

where the normalized mode effective indices b and b' are defined by $$b = (n_{eff}^2 - n_b^2)/(n_s^2 - n_b^2) \quad (3a)$$

$$b' = (n_{eff}'^2 - n_b^2)/(n_{eff}^2 - n_b^2) \quad (3b)$$

Here $n_{eff}'$ is the effective index of the first-order mode for finite W and $n_{eff}$ would be its effective index for $W = \infty$. For small $\Delta n$, Eq. (2) can be reduced to give $$\theta_p \simeq [(2 \Delta n b/n_b)(1-b')]^{\frac{1}{2}} \quad (4)$$

If we assume no sideways diffusion in the channel, the dispersion equation relating b' and W is $$V(1-b')^{\frac{1}{2}} = 2 \tan^{-1}[b'/(1-b')]^{\frac{1}{2}} \quad (5a)$$

where $$V = kW(n_{eff}^2 - n_b^2)^{\frac{1}{2}} \quad (5b)$$

Here V' is the normalized guide width and $k = 2\pi/\lambda_o$ is the free-space wave vector. Substituting Eq. (5) into Eq. (4) yields $$2\theta_p = \frac{\lambda_o}{n_b W} \left( \frac{\tan^{-1}[b'/(1-b')]^{\frac{1}{2}}}{\frac{1}{2}\pi} \right) \quad (6)$$

Equation (6) now shows the explicit dependence of $\theta_p$ on W. As W becomes large and $b' \to 1$, the term in brackets in Eq. (6) approaches unity. Then Eq. (1) for well-confined modes far from cutoff becomes $$\theta_h \simeq \alpha \lambda_o/2n_b W \quad (7)$$

which suggests a horn which diverges more slowly than diffraction from an aperature of width W. The rate of change of waveguide width W is given by $$dW/dz = \alpha v_o/n_b W \qquad (8)$$

which after integration yields $$W^2 = (2\alpha\lambda_o/n_b)z + W_o^2.$$

Figure 2:
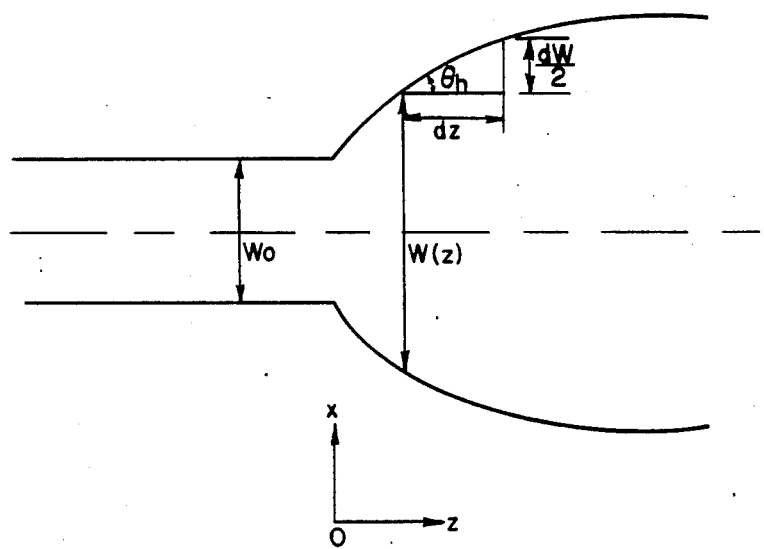
FIG. 2 is a schematic diagram illustrating the geometry of a channel waveguide coupled to a parabolic horn.

(See FIG. 2 for the definitions of dW and dz for a parabolic horn.) Here $W_o$ is the initial guide width for $z=0$. In this limit the horn shape is parabolic. In the more general case of arbitrary b'(W), the integration cannot be explicitly performed and the horn shape will not be strictly parabolic.

For these equations to be valid, W is assumed to be large, viz., greater than approximately 10 to 20 times the optical wavelength, $\lambda_o$, which provides values of b' approaching unity, or approximately between 0.8 and 1.

Figure 3:
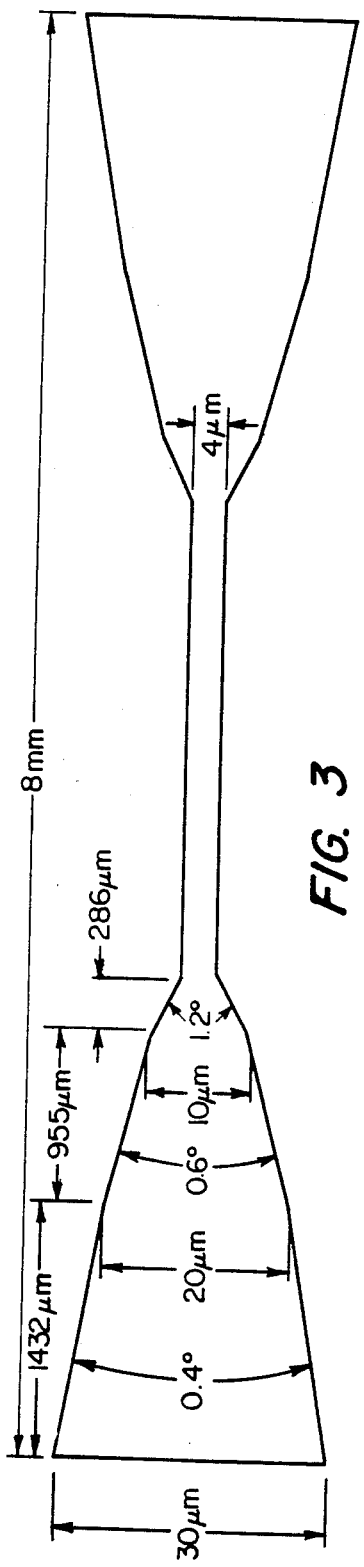
FIG. 3 is a schematic plan view of a narrow-channel waveguide coupling into a parabolic horn at either end with some typical dimensions being given.

Coupling horns were designed using Eqs. (1), (4), and (5) for channels of initial width of 2, 4, 6, and 8 μm increasing to 30 μm. Values of $\alpha=1$, $n_b=2.2$, $\Delta nb=5\times10^{-4}$ were assumed and b' was calculated from Eq. (5) which neglects sideways diffusion. The resulting horns were between 2.5 and 2.7 mm long. The theoretical curved shapes were approximated by three or four linear segments (see FIG. 3) to facilitate the photolithographic mask fabrication on a computer-controlled pattern generator. A portion of the final mask showing the 4-μm channel with identical input and output horns is shown in FIG. 3. The other channels had similar coupling horns and the 2-μm channel had an additional 1.8° section. A 100-μm-wide strip was also included on the mask to provide an essentially planar waveguide for relative transmission measurements.

The pattern of four channels with input and output coupling horns was photolithographically delineated on a Y-cut sample of LiNbo3 coated with 175 Å of Ti. The channels ran parallel to the X axis. After etching to remove the field, the Ti was diffused at 1000° C. for 6 hours in Ar. Such a procedure had previously been determined to yield a planar waveguide with a Gaussian diffusion depth of about 2 μm. Measurements of the input prism coupling angle on the 100 μm-wide strip showed that the strip supported a single TM mode with parameters $\Delta n=0.005$ and $b=0.2$. The effect of achieving an experimental value of $\Delta nb$ larger than the design value is equivalent to choosing α slightly less than unity at the narrow end of the horn and increasing α to unity at the wide end. Electron microprobe results on similar samples indicate that the sideways diffusion for this orientation is quite large, approximately 4.5 times diffusion down, so that the diffused channel width was larger than the width defined by the mask. In this case Eq. (5a) is no longer valid and Eq. (2) must be generalized. Qualitatively, it is found that for small values of W the normalized effective index b' is reduced and the ray angle $\theta_p$ increases. For large values of W, the opposite occurs and $\theta_p$ decreases slightly.

Transmission measurements at 0.6328 μm were made by prism coupling a TM mode into each input horn and coupling out at various points along each channel and output horn. Relative measurements were obtained by making identical measurements on the 100 μm-wide strip. Geometrical matching at the input horn was obtained by focusing the input laser with a combination of a 1-m-focal-length circular lens and a 50-mm-focal-length cylindrical lens. This resulted in a rectangular focal spot on the prism base roughly 1 mm by 50 μm. To correct for input prism coupling efficiency differences between the horns and the 100-μm wide strip, the back-reflected power from the input prism was monitored and the prism coupling efficiency was calculated for each case. Typical prism coupling efficiencies were 69% and 47% of the incident power in the prism for the 100-μm-wide strip and the horns, respectively. With the edge of the input prism placed at a position corresponding to a horn width of 23 μm, horn transmission data were taken for prism separations of 5.5., 4.5, and 4.0 mm. In evaluating the data, differences in transmission loss between the 100-μm-wide strip and the channels are ignored. Since any power mode converted to higher-order modes in the output horn is still coupled out by the output prism and detected, the transmission of the output horn is taken to be 100%. The resulting average value of the input horn transmission for the three largest channels is shwn in Table I below and is close to 90% in each case. Reliable data for the 2-μm channel could not be obtained either because of a break in the channel or because the mode in the channel was so close to cutoff that very little power was transmitted. These data were taken at low incident power levels ($<1$ μW) to avoid effects of optical damage in the channels. TM (ordinary) polarization was used to avoid additional extraordinary planar modes that arise from Li outdiffusion. Experimental observations of the input azimuthal coupling angle about the axis of the horn indicated that the 4-μm channel was single mode, while the 6- and 8-μm channels supported two transverse modes.

TABLE I

| Measured average values of input horn transmission. | |
|---|---|
| Channel width (μm) | Transmission (%) |
| 8 | 92 ± 7 |
| 6 | 92 ± 10 |
| 4 | 87 ± 5 |

An analytical approach for estimating the power lost through mode conversion in horn-shaped structures suggests that an upper bound on the power converted from the lowest-order mode in a parabolic horn can be given by $$(P_{conv}/P_o)_{max} = 1/16\alpha 2 \qquad (10)$$

Thus for the present structures which have $\alpha \approx 1$, losses due to mode conversion from the transition would not be expected to be greater than 6%. This is consistent with measured results, considering that increased transmission loss in the channels have been ignored.

The theory presented here indicates that the widest part of a transition horn is the critical section and, that with proper design, horn length should be nearly independent of the width of the channel at the narrow end. The measured results are consistent with this in that high transmission efficiencies have been measured for three horns of essentially the same length but with narrow channel widths differing by a factor of 2. Thus, very high transmission efficiencies can be achieved with parabolic-shaped horns, and this shape is likely to provide maximum transmission in a minimum length. A consequence of the parabolic shape is that transitions to very wide waveguides will require very long structures.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. Means for coupling between a narrow and a wide-channel optical waveguide for bidirectionally propagating rays of single-mode optical power and preserving the power in the first-order mode comprising:

a coupling section of optical dielectric waveguide having a constant refractive index, and having a shape varying in width from a narrow opening, for fitting the width of the narrow-channel optical waveguide, to a wider opening for fitting the width of the wide-channel optical waveguide, so that said coupling section forms a continuous waveguide from said narrow-channel waveguide to said wide-channel waveguide, said shape being defined from the equation $$\theta_h = \alpha\theta_p = \frac{\alpha\lambda_o}{2n_bW} \frac{\text{TAN}^{-1}[b'/(1-b')]^{\frac{1}{2}}}{\pi/2} = \frac{1}{2}\frac{dW}{dz}$$

where $\theta_h$ is the local angle formed by the wall of the coupling section and the waveguide axis, $\theta_p$ is the projection of the ray angle of the lowest-order mode in the plane of the coupling section, $\lambda_o$ is the free-space wavelength of the lowest-order normal mode of the narrow-channel waveguide, $n_b$ is the bulk index of refraction of the material which bounds the waveguide, z is the distance coordinate along the axis of the coupling section, W is the width of the coupling section at any specific value of z along the axis of the section, $\alpha$ is a constant less than or equal to unity, and b' is the normalized mode effective index of refraction, b' being defined as $$b' = (n_{eff}'^2 - n_b^2)/(n_{eff}^2 - n_b^2)$$

wherein $n'_{eff}$ is the effective index of refraction of the first-order mode for finite W, and $n_{eff}$ is the effective index of refraction of the first-order mode for $W = \infty$.

2. Means as defined in claim 1, wherein as W becomes large on the order of approximately 10 to 20 times or more than the optical wavelength in free-space to be propagated through said coupling section, then b' approaches unity so that the equation for $\theta_h$ becomes $$\theta_h = \alpha\lambda_o/2n_bW = \frac{1}{2}dW/dz$$

which causes W to approach the shape of a parabola defined by the equation $$W^2 = (2\alpha\lambda_o/n_b)z + W_o^2$$

where $W_o$ is the width of the section at its narrowest point $z = 0$.

* * * * *